(12) United States Patent
Adlington

(10) Patent No.: US 9,303,422 B2
(45) Date of Patent: Apr. 5, 2016

(54) PLASTIC SHEETING AND A MOULD THEREFOR

(75) Inventor: Anthony Peter Adlington, Tenterden (GB)

(73) Assignee: Plastipack Limited (GB)

( * ) Notice: Subject to any disclaimer, the term of this patent is extended or adjusted under 35 U.S.C. 154(b) by 933 days.

(21) Appl. No.: 13/499,628

(22) PCT Filed: Oct. 4, 2010

(86) PCT No.: PCT/GB2010/001851
§ 371 (c)(1),
(2), (4) Date: Mar. 30, 2012

(87) PCT Pub. No.: WO2011/039520
PCT Pub. Date: Apr. 7, 2011

(65) Prior Publication Data
US 2012/0189816 A1    Jul. 26, 2012

(30) Foreign Application Priority Data
Oct. 2, 2009  (GB) .................................. 0917308.9

(51) Int. Cl.
B32B 1/00       (2006.01)
B32B 3/12       (2006.01)
E04H 4/10       (2006.01)
B29C 51/10      (2006.01)
B29C 51/36      (2006.01)
B29C 51/30      (2006.01)

(52) U.S. Cl.
CPC ................ *E04H 4/103* (2013.01); *B29C 51/10* (2013.01); *B29C 51/30* (2013.01); *B29C 51/36* (2013.01); *B32B 2553/026* (2013.01); *Y10T 428/24504* (2015.01)

(58) Field of Classification Search
CPC ............ B32B 3/12; B32B 3/28; B65D 81/03; B65D 65/44; E04H 4/103; E04H 4/105; E04H 4/10; F24J 2/0472
USPC .................. 428/72, 75, 166, 178; 4/498, 499; 126/565, 566
See application file for complete search history.

(56) References Cited

U.S. PATENT DOCUMENTS

| | | |
|---|---|---|
| 3,341,895 A | 9/1967 | Shelby |
| 4,203,268 A | 5/1980 | Gladden, Jr. et al. |
| 4,628,549 A | 12/1986 | Lazar |
| 4,869,939 A | 9/1989 | Santo |
| 5,395,674 A | 3/1995 | Schmidt et al. |

(Continued)

FOREIGN PATENT DOCUMENTS

| | | |
|---|---|---|
| CN | 201106295 Y | 8/2008 |
| FR | 991671 A | 10/1951 |
| GB | 2342888 A | 4/2000 |

(Continued)

OTHER PUBLICATIONS

Machine translation of JP 2003-237842, published Aug. 27, 2003.*

*Primary Examiner* — Catherine A Simone
(74) *Attorney, Agent, or Firm* — Heisler & Associates

(57) ABSTRACT

In a plastic sheeting material incorporating an array of bubble cells, the cells are shaped with two chambers connected by a constricted region. The chambers are part-spherical e.g. in the form of truncated spheres. The constricted region has concave side walls and/or a concave top wall. The sheeting may have two, three or more layers. Molds for producing the sheeting material have suitably-placed suction holes.

9 Claims, 4 Drawing Sheets

(56) References Cited

U.S. PATENT DOCUMENTS

| | | | |
|---|---|---|---|
| 5,511,536 A | 4/1996 | Bussey, Jr. et al. | |
| 5,679,439 A | 10/1997 | Schmidt et al. | |
| 7,041,361 B2 * | 5/2006 | Thomsen et al. | 428/178 |
| 2001/0025388 A1 | 10/2001 | Handwerker | |
| 2006/0210773 A1 * | 9/2006 | Kannankeril | 428/166 |

FOREIGN PATENT DOCUMENTS

| | | |
|---|---|---|
| JP | 2003237842 A | 8/2003 |
| WO | WO 02/086258 A1 | 10/2002 |

* cited by examiner

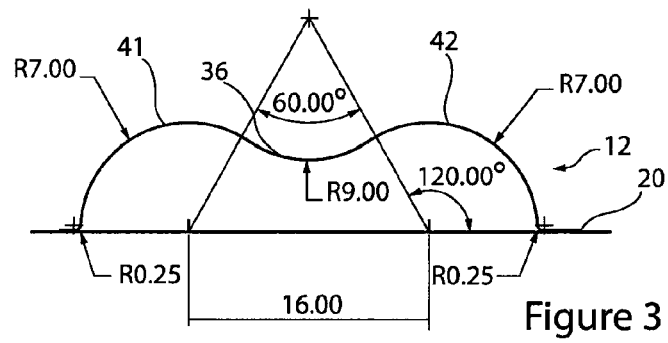
Figure 3
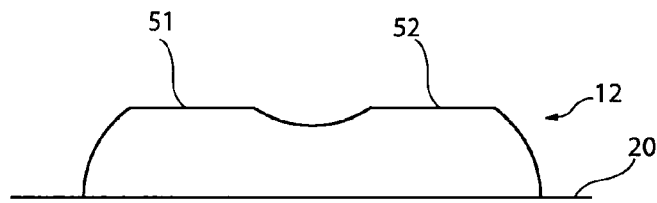
Figure 4
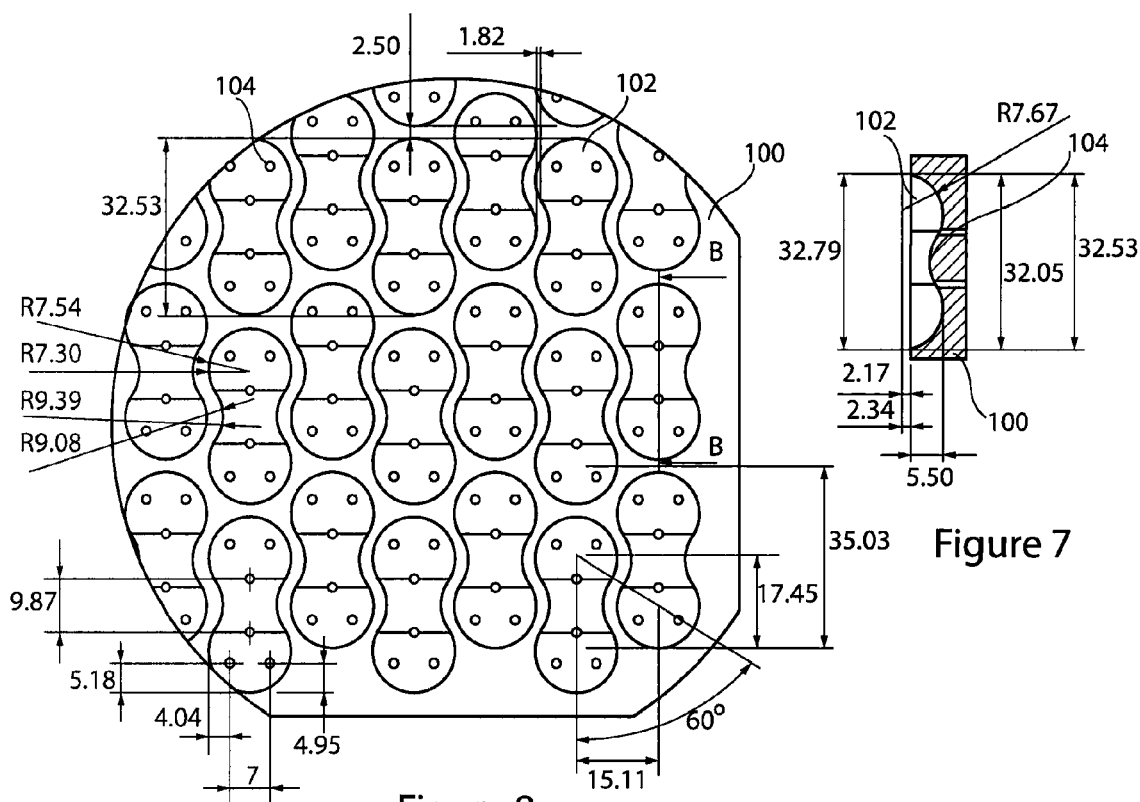
Figure 7
Figure 8

PLASTIC SHEETING AND A MOULD THEREFOR

CROSS-REFERENCE TO RELATED APPLICATIONS

This application claims benefit of the earlier filing dates associated with International Application No. PCT/GB 2010/001851 filed on Oct. 4, 2010, which designates the United States and other countries; and GB 0917308.9 filed on Oct. 2, 2009 which was claimed for priority in the above-identified international application.

FIELD OF THE INVENTION

The present invention relates to plastic sheeting, especially sheeting for use in making a swimming pool cover. The invention also relates to a mould for producing such sheeting.

BACKGROUND OF THE INVENTION

Existing sheeting comprises the two layers of plastic sheeting laminated together to form a so-called bubble plastic material. The bubble shapes are vacuum-formed in one sheet (which is the case of swimming pool covers is the bottom sheet) and this is then laminated to a substantially flat sheet, to form sealed bubbles between the two layers.

The bubbles normally have a circular cylindrical shape, but hexagonal, diamond-shaped and part-spherical bubbles are also known.

U.S. Pat. No. 4,869,939 discloses sheets of air encapsulating cellular material comprising an array of cells, adjacent ones of which are in flow communication with each other via intermediate passages.

JP 20032377842A discloses a sheet with air bubbles connected in groups by intermediate connection passages.

SUMMARY OF THE INVENTION

Aspects of the invention seek to provide improved plastic sheeting. Existing plastic sheeting has a ratio between the area of a sheet covered by bubbles and the area of the sheet between the bubbles. An aspect of the present invention seeks to provide a sheet with a higher ratio than existing sheeting.

Another aspect of the present invention seeks to provide sheeting with greater stiffness and/or greater resistance to creasing.

Existing plastic sheeting has several weak points in its design. These weak points are areas of plastic that have high residual stress due to vertical pulling of molten plastic during forming. The thinnest point is the part that will fail first as in the weakest link in the chain. The weakest point in the standard material is 90 microns. A further aspect of the invention seeks to provide a sheet with no such weak points.

According to a first aspect of the present invention there is provided a plastic sheeting incorporating a plurality of bubble cells comprising two chambers interconnected by a relatively constricted region, the chambers having a circular shape in plan view, wherein the interconnecting regions have arcuate sides which are concave in plan view.

An advantage of such sheeting is that the stiffness of an individual bubble cell, and also of the entire sheet material, is increased. This avoids undesirable creasing both in use and when being unwound from or wound onto a storage roll. It also provides a stronger material and assists in reducing unwanted movements of the sheeting during use thereof.

In addition, since the constricted region also forms part of an individual bubble cell, the ratio of the bubbled area to the area without bubbles is increased. This creates improved thermal insulation and serves to maximise the air entrapment in the bubbles.

Preferably the chambers are each part-spherical in shape. An advantage of this shape is that there are reduced residual stresses both during manufacture and in use due to the larger radii of curvature at the changes of section in the bubble cell. Another advantage is that the radii of curvature provide a uniform thickness during the vacuum-forming process; this avoids the danger of air leakage at regions which are too thin.

The "waistline" design of the constricted region restricts expansion and contraction of the air in the bubble cells by combining concave and convex sections.

In preferred arrangements the region between the chambers is also concave in side view, so that the region is constricted in both directions transverse to a line connecting the chambers.

The chambers may have the shape of truncated spheres. The chambers may be truncated at their regions adjacent to the second layer and also at their diametrically opposed regions. Alternatively they may be are truncated only at their regions adjacent to the second layer.

The distance between the centres of the spherical shapes is preferably 2.2 to 2.5 and most preferably substantially 16:7 or 2.29 times the radius of the spherical shapes.

In preferred sheeting the height of the interconnected regions lies within the range of 40% to 70% of the height of the chamber. A particularly preferred height is substantially 66%. A preferred bubble height is 5.5 mm so the height of the region 34 should preferably be between 2.2 mm and 3.85 mm to provide a thickening section which gives the material its stiffness. Otherwise heights below 40% will thicken too much thus creating a stress on the join area of a thick and a thin section of plastic while heights over 70% will not allow a significant thickening as to impart sufficient stiffness.

The sheeting preferably comprises a first layer, which incorporates the bubble shapes, laminated to a substantially flat second layer. The second layer may be of a plastic material, or a metallic foil or a metallised film.

A third layer may be laminated to the side of the first layer remote from the second layer. The third layer may be of a plastic material, or a metallic foil or a metallised film.

According to a second aspect of the present invention, there is provided a plastic sheeting incorporating an array of bubble cells, wherein each cell comprises first and second chambers interconnected by a relatively constricted region, the cells being arranged spaced apart in columns defining a longitudinal direction parallel to the straight line connecting the centres of the chambers of each cell, wherein in the transverse direction perpendicular to the longitudinal direction, the centre of a first chamber of each cell is aligned with a spacing between adjacent cells in an adjacent row and the centre of the second chamber of each cell is aligned with the centre of the constricted region of an adjacent cell in the adjacent row.

An advantage of this configuration is that it allows a high packing density of cells distributed over the surface of the material.

According to a third aspect of the present invention, there is provided a mould for producing plastic sheeting according to the first or second aspect by a vacuum-forming process, the mould defining a plurality of shapes each comprising two chambers interconnected by a relatively constricted region, wherein a part of the mould defining a first chamber of each shape has at least one suction hole, a part of the mould defining the second chamber of each shape has at least one suction hole, and a part of the mould defining the interconnecting region, or adjacent an edge thereof, has at least one suction hole.

Moulds with such a suction hole distribution produce an even force on the plastics material, which enables quick production without weakening of the material.

BRIEF DESCRIPTION OF THE DRAWINGS

Preferred embodiments of the present invention will now be described, by way of example only, with reference to the accompanying drawings, of which:

FIG. 3 is a side cross-sectional view of a bubble cell and showing further preferred dimension in millimeters;

FIG. 4 shows a modification of the bubble cell of FIG. 3;

FIG. 7 shows a view of a first mould for producing sheeting in accordance with the present invention;

FIG. 8 shows a side view of an individual cavity of the mould of FIG. 7, taken on the line B-B;

DESCRIPTION OF THE PREFERRED EMBODIMENT

Figure 1:
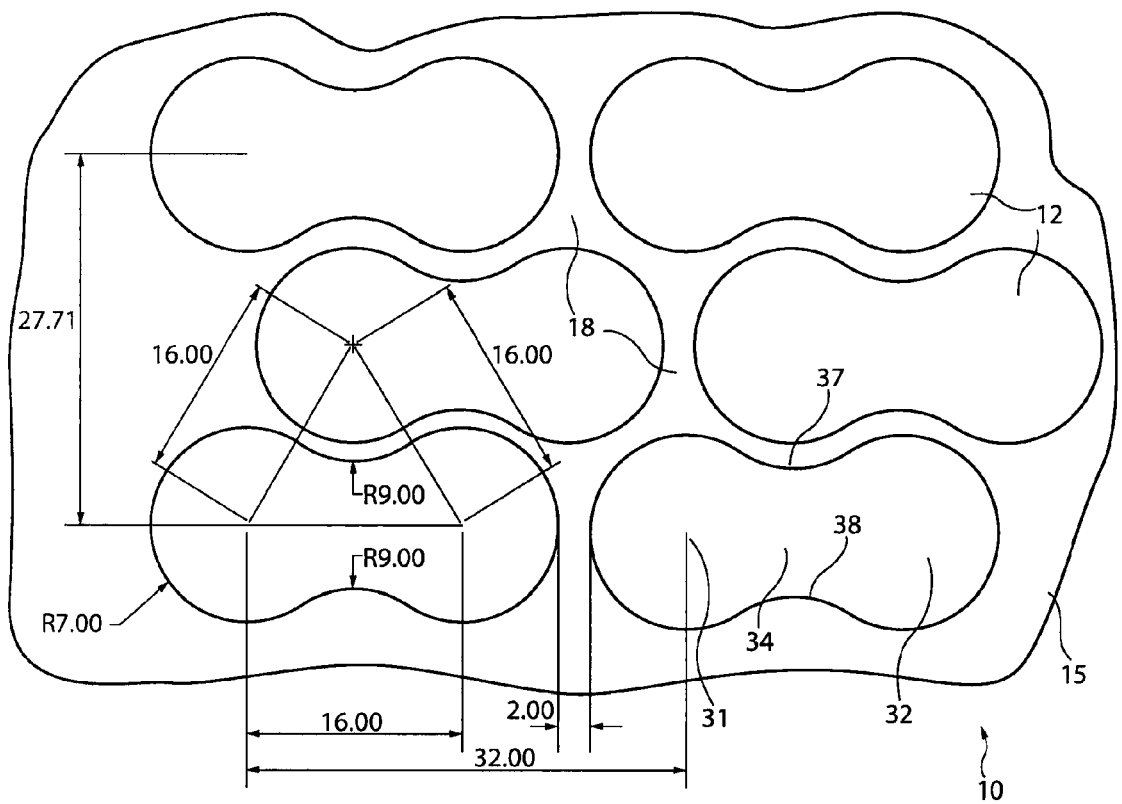
FIG. 1 is a bottom plan view of plastic sheeting in accordance with a first embodiment of the present invention, showing preferred dimensions in millimeters.

Referring to the drawings, a sheet 10, FIG. 1, of two layers of plastic material, has a repeated pattern or array of bubble cells 12. As will be seen, the bubble cells in the centre row of FIG. 1 shown are staggered with respect to the cells in the adjacent rows. FIG. 1 shows a bottom view of the sheet and thus the bottom layer 15 incorporating the bubble shapes of the two layers is visible. The top layer 20, FIG. 3, is substantially flat and is laminated to layer 15 to form the sealed bubbles therebetween.

The typical thickness of the material of both layers 15 and 20 is substantially 450 microns. An 0.25 mm radius fillet is provided at all edges. Both layers may be transparent or both layers may be opaque. Layer 15 may be opaque and layer 20 transparent or vice versa. When they are transparent, the layers may be tinted. When they are opaque the layers may be coloured, e.g. blue, or black.

In manufacture, the bubble shapes are produced in layer 15 in a vacuum-forming apparatus and the layers are immediately laminated to each other in an adjacent part of the apparatus. It will be seen, that flat areas 18, known as lands, are produced between the cells 12.

Figure 2:
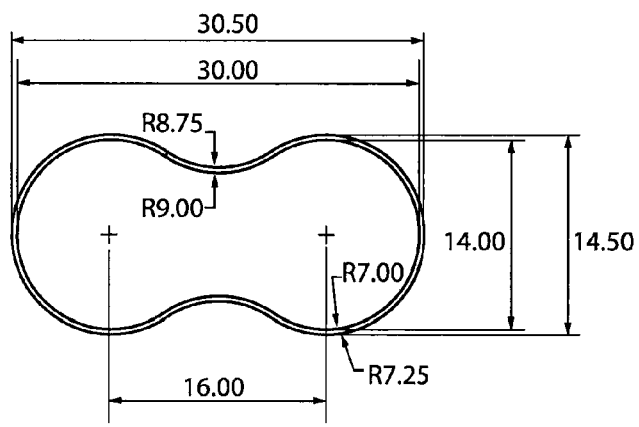
FIG. 2 is a bottom view of an individual bubble cell and shows further preferred dimensions in millimeters.

The shapes of the bubble cells 12 are determined by the shape of the corresponding moulds of the vacuum-forming apparatus and in the embodiment of FIG. 1 this somewhat resembles the shape of a peanut. Each bubble cell comprises two enlarged ends or chambers 31, 32 of substantially part-spherical shape. Between the two chambers there is provided a constricted region 34, which can be considered as a neck or as a waistline. Compared with the convex curves of the chambers 31, 32 region 34 has a concave curvature 36 in side view, FIG. 3, and concave curves 37, 38 on both sides in plan view, FIGS. 1 and 2. It will be appreciated that FIG. 3 shows the material with its bottom layer uppermost.

Smooth contours are provided everywhere, including where the convex and concave curves merge. It will be noted that each bubble cell is symmetrical about its longitudinal axis, which passes centrally of the constricted region 34. Each bubble cell is also symmetrical about a transverse axis passing through the centre of the constricted region.

The above-described material has a number of advantages. The shape of the bubble cell is configured to improve its stiffness and that of the entire sheet. This serves to avoid, or at least reduce, the creation of creases in the sheeting during fabrication, deployment and use. This is particularly advantageous when winding and unwinding swimming pool cover reels.

In addition the material does not collect water, which simply runs off the bubble shapes, which also facilitates winding of the material.

The radii of curvatures provide a uniform thickness of material during the vacuum forming process, leading to uniform strength and the avoidance of possible weak spots. This contracts with existing bubble plastic material, in which relatively sharp edges of the mould, about which the plastic sheeting is stretched during the vacuum-forming process, lead to undesired thinning and thus weakening of the material produced. Weakening of the material is especially disadvantageous in applications where the material is subject to exposure to corrosive environments, such as swimming pools. In such environments the sheeting can be exposed at various times to chlorine, acidic or alkaline water and other various chemical types used in pools to maintain hygiene standards.

The thinnest points in the above-described material are in the range 160 to 200 micron, which is substantially thicker than existing bubble plastic material. Thus, corrosive elements in the water take much longer to attack and break down the thinnest points.

Figure 5:
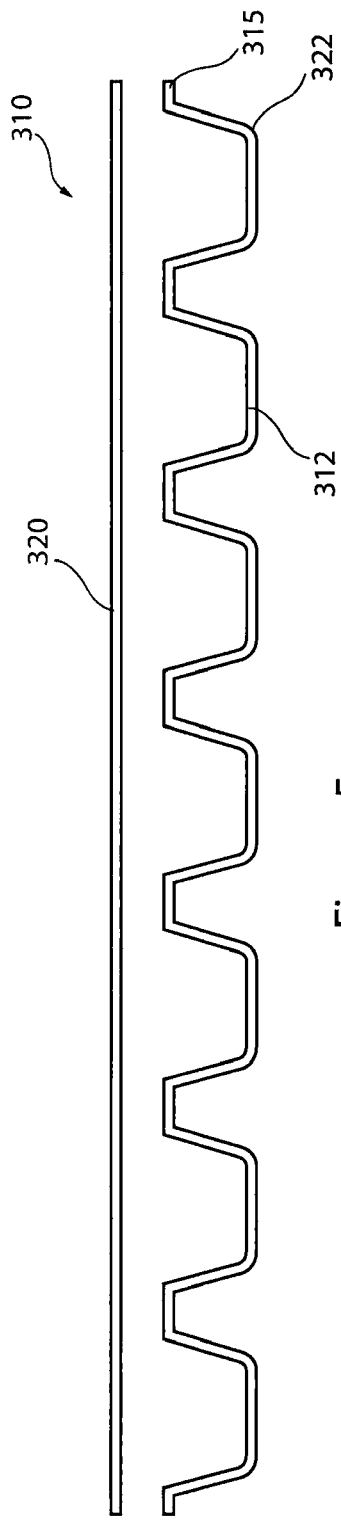
FIG. 5 shows a cross-sectional view of prior art sheeting before lamination.
Figure 6:
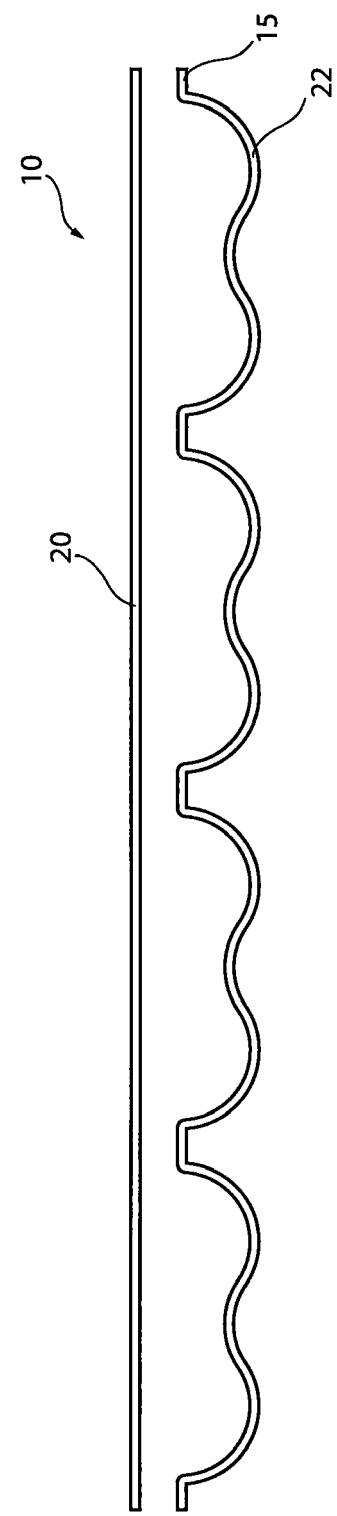
FIG. 6 shows a similar cross-sectional view of sheeting in accordance with the present invention.

FIGS. 5 and 6 give indications of the thinnest regions of sheeting in accordance with the prior art and the present invention, respectively. FIG. 5 shows a cross-section of a prior art sheet 310, before lamination, comprising a flat top layer 320, with typical thickness 150 microns, and a bottom layer 315 with typical thickness 300 microns, and defining bubble shapes 312. The location 322 of greatest weakness is in the area of the circular end of the bubble 312; a typical thickness at this region is 90 microns. Another location of substantial weakness is at the opposite end of bubble 312.

FIG. 6 shows a similar view of a sheet 10 in accordance with the present invention. Flat sheet 20 has a thickness of approximately 150 microns and bottom sheet 15 with the "peanut" formations has a thickness of approximately 300 microns. The thinnest region of the sheet 10 is indicated at 22.

The "waistline" design resists expansion and contraction of the air in the bubble by combining concave and convex sections. The increased ratio, compared to conventional bubble plastic sheeting, of the area of the bubble cells to the area of the intermediate lands gives the sheet improved flotation characteristics when used as a swimming pool cover. In addition, it leads to better thermal insulation by maximising the air entrapment in the bubble.

Furthermore, the bubbles have lower residual stresses by providing larger radii of curvature at changes of section. Residual stress in materials is caused by stressing a material during a process of manufacture; an example of this is pulling plastic through a mould at tight angles such as 70 degrees. When the product cools after processing, the stress is trapped in the material. This creates a weak point in the material, and when it comes under UV or chemical attack it will be quicker to fail due to this trapped stress in the material which needs to be relieved. In a confined shape the stress can only be alleviated through changing shape or cracking of the material to relieve pressure. Manufacture of materials in accordance with the above-described embodiment involves much less material stress due to the relatively gentle angle of plastic flow in the mould as contracted with the sharp angles in previous moulds. Typical angles for moulds in accordance with the present invention are 30° to 60°, preferably substantially 40°, whereas angles of flow in previous moulds are typically up to 70° to 90°. The smoother contours permit higher speeds of operation of the vacuum rollers of a manufacturing apparatus. The edge fillet also serves to allow smooth plastic flow.

The substantially increased air volume inside the cells allows for more expansion of air as the swimming pool cover expands due to a mixture of rising air temperature, barometric pressure and permeation of swimming pool water vapour which expands air in the material. If there was no space for this air to expand it would stretch the material. This would mean constant stretching and contracting of the bubble material every day due to temperature changes between day and night. This in turn would create stress in the material leading eventually to failure.

During vacuum forming the material, it is thinnest where it expands most. Thus the material in the constricted region 34 is thicker than at the chambers 31, 32. This thicker centre section supports the chambers on each side and therefore they are less likely to collapse or degrade due to expanding air in the bubble. The thicker centre region is also believed to contribute to the stiffness of the material mentioned previously. It increases the rigidity of material in desired directions, but still allows for simple rolling up of the material onto a reel. Trying to pull a less rigid material onto a body of water can be difficult as its shape will not hold and could collapse against the force exerted by the water.

Various modifications can be made to the above-described sheeting. In particular, the dimensions of the bubble cells can be larger or smaller as desired. The individual radii can also be larger or smaller to adjust the overall appearance.

In order to produce satisfactory curves 41, 42 at the bottom of the chambers 31, 32, inserts of brass material can be inserted in the mould of the vacuum-form apparatus. These inserts produce a truncated spherical shape 51, 52 at the bottom of the chamber as shown in FIG. 4. Since these regions are only relatively small parts of the whole bubble cell, this modification still provides substantial advantages.

As an alternative to inserting inserts in the mould, small holes can be drilled therein.

Instead of being constricted in both directions perpendicular to the longitudinal axis of the bubble cell 12, the region 34 may be constricted in its height only (i.e. perpendicular to the plane of the sheet) or in its width only (i.e. parallel to the plane of the sheet).

Top layer 20 may be of a non-plastics material such as a metal foil, e.g. aluminium foil.

The bubble cells may be arranged in a modified pattern. Regarding the longitudinal axes of the bubble cells as defining the direction of a column, FIG. 1 shows three columns, each column extending horizontally in FIG. 1. In the modified pattern, the cells in the third column (i.e. the bottom column in FIG. 1), instead of being aligned transversely with the cells in the first column (i.e. the top column in FIG. 1) are instead shifted by a distance "x" to the right relative to the cells in the second column (i.e. the middle column in FIG. 1), where "x" is the distance by which the cells in the second column are shifted to the right relative to the cells in the first column. With this modified pattern, it will be seen that the cells in a fourth column will be aligned transversely with the cells in the first column.

FIGS. 7 and 8 show a corner of a mould plate 100 for use in vacuum-forming plastic sheeting with preferred dimensions being indicated in millimeters.

It will be appreciated that, if the plastic sheeting is regarded as a "positive" shape, the mould constitutes the corresponding "negative" shape. The mould has a plurality of cavities 102 shaped to produce the cells 12. It will be seen that each cavity is provided with six suction holes 104 for subjecting the material to a vacuum-forming process. Two of the holes are arranged in each end of the cavity defining a respective chamber 31, 32, and a respective hole is arranged in or adjacent to each transition region between a chamber and the intermediate constricted region. Such a suction pattern allows the even and quick application of a vacuum to the material.

Figure 9:
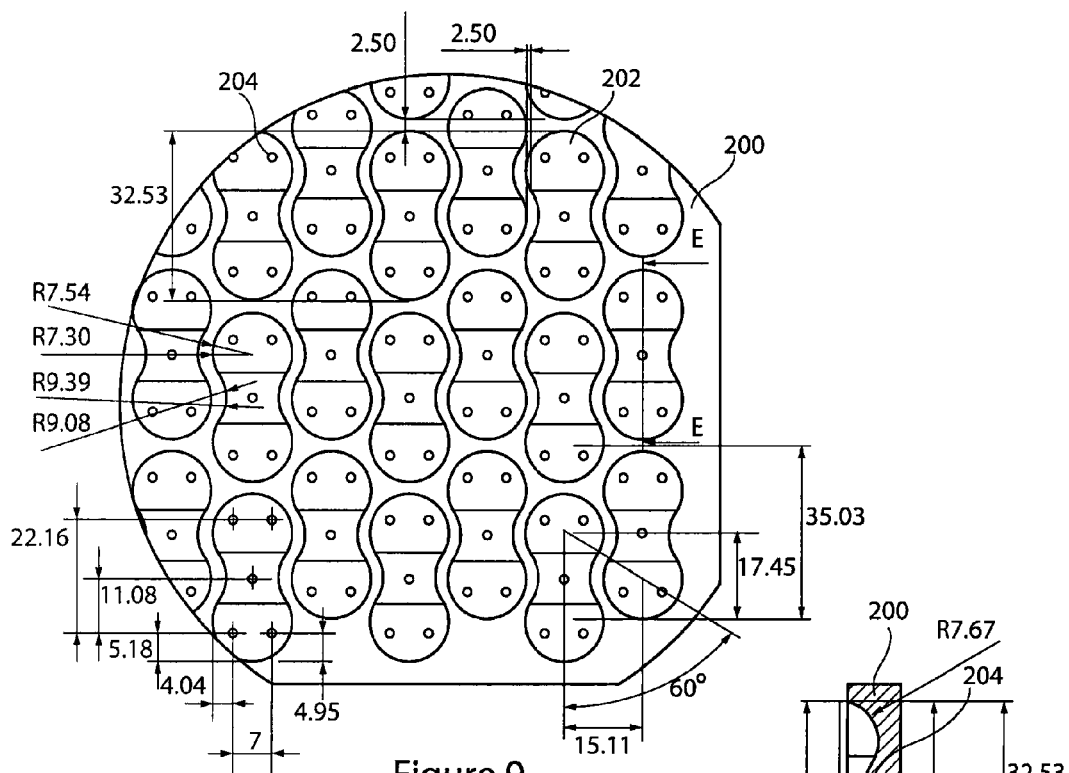
FIG. 9 shows a view of a second mould for producing sheeting in accordance with the present invention.
Figure 10:
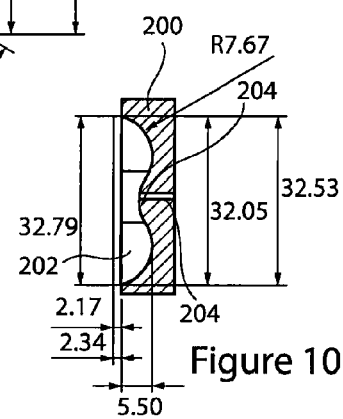
FIG. 10 shows a side view of an individual cavity of the mould of FIG. 9, taken on the line E-E.
Figure 11:
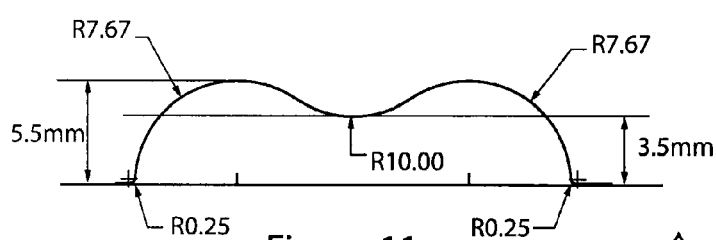
FIG. 11 shows an enlarged side view of the cavity of FIG. 10.

FIGS. 9, 10 and 11 show a corner of an alternative mould plate 200 to the mould plate of FIGS. 7 and 8. In this case, cavities 202 each have five suction holes 204, two towards each end of a cell 12, and one substantially centrally of the intermediate constricted region. This suction pattern also enables an even and quick exposure of the material to a vacuum. The difference of heights of 2 mm indicated in FIG. 11 represents a ratio of heights of central to main bubble of substantially 63%; this leads to a greater thickness in the central region.

The number and pattern of suction holes 104, 204 may be selected as desired.

Figure 12:
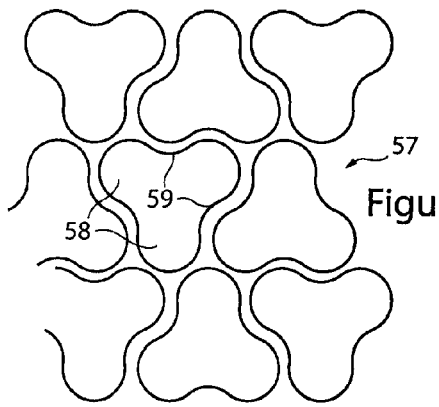

Different patterns of bubble cells 12 may be provided. For example, cells 57 may be connected in groups of three as shown in FIG. 12 so that each group comprises three enlarged ends 58, i.e. individual bubbles, interconnected by three constricted regions 59. The centres of the part-spherical bubbles 58 can be located relatively further apart, in which case the regions 59 therebetween have a greater degree of constriction.

Figure 13:
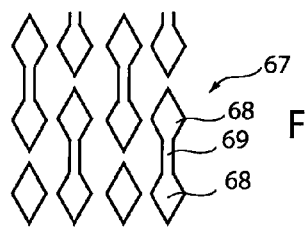
FIGS. 12, 13 and 14 show bottom plan views of plastic sheeting in accordance with further embodiments of the present invention.
Figure 14:
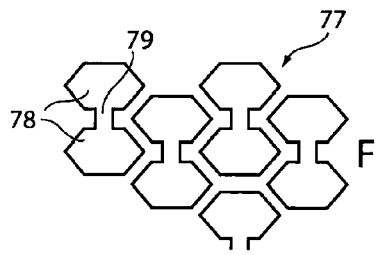

In the embodiment of FIG. 13, cells 67 have diamond-shaped pairs of bubbles or ends 68 interconnected by respective constricted regions 69. In the embodiment of FIG. 14, cells 77 have hexagonal bubbles or ends 78 interconnected by respective constricted regions 79. Any suitable inter-fitting patterns of bubbles may be employed. In modifications, the bubbles may be interconnected by constricted regions in groups of three or four or more.

The sheeting is conveniently employed as a swimming pool cover. It can conveniently be rolled off and on a roller to selectively cover a pool to improve heat retention and solar gain, algae suppression, debris collection etc. and to reduce water evaporation. It can also be used to cover other areas of water, such as reservoirs. However, in view of its improved handling characteristics, the sheeting has numerous other applications such as packaging and greenhouse insulation. When used in connection with aluminium foil, or with aluminium foil being used as top layer 20, there is provided an effective material suitable for insulating walls (e.g. behind radiators). A polyester metallised film may be used instead of aluminium foil.

The sheeting may comprise three layers. In one modification a third layer of reinforced plastic is laminated to the side of the second layer remote from the first layer. In another modification a third layer of a metallic foil or metallised film is laminated to the side of the second layer remote from the first layer.

Alternatively, or in addition, a further layer, which may be of a plastic, especially a reinforced plastic, or a metallic foil or metallised film, can be laminated to the side of the first layer remote from the second layer, making three or four layers in all.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

The invention claimed is:

1. A plastic sheeting incorporating an array of bubble cells, wherein each cell comprises first and second chambers interconnected by a relatively constricted region, the cells being arranged spaced apart in columns defining a longitudinal direction parallel to the straight line connecting the centres of the chambers of each cell, wherein in the transverse direction perpendicular to the longitudinal direction, the centre of a first chamber of each cell is aligned with a spacing between adjacent cells in an adjacent row and the centre of the second chamber of each cell is aligned with the centre of the constricted region of an adjacent cell in the adjacent row, the chambers having a circular shape in plan view, wherein the interconnecting regions have arcuate sides which are concave in plan view; and comprising a first layer, which incorporates the bubble shapes, laminated to a substantially flat second layer.

2. A sheeting according to claim 1, wherein the chambers are each part-spherical in shape.

3. A sheeting according to claim 1, wherein the interconnecting regions are concave in side view.

4. A sheeting according to claim 1, wherein the chambers have the shape of truncated spheres.

5. A sheeting according to claim 1 wherein the height of the interconnected regions lies within the range of 40% to 70% of the height of the chamber.

6. A sheeting according to claim 1, wherein a third layer of reinforced plastic is laminated to the side of the second layer remote from the first layer.

7. A sheeting according to claim 1, wherein a third layer is laminated to the side of the second layer remote from the first layer, said third layer taken from the group including a metallic foil and a metallised film.

8. A sheeting according to claim 1, wherein a further layer is laminated to the side of the first layer remote from the second layer.

9. A plastic sheeting incorporating an array of bubble cells, wherein each cell comprises first and second chambers interconnected by a relatively constricted region, the cells being arranged spaced apart in columns defining a longitudinal direction parallel to the straight line connecting the centres of the chambers of each cell, wherein in the transverse direction perpendicular to the longitudinal direction, the centre of a first chamber of each cell is aligned with a spacing between adjacent cells in an adjacent row and the centre of the second chamber of each cell is aligned with the centre of the constricted region of an adjacent cell in the adjacent row, the chambers having a circular shape in plan view, wherein the interconnecting regions have arcuate sides which are concave in plan view;

wherein the chambers are each part-spherical in shape; and wherein the distance between the centres of the spherical shapes is 2.2 to 2.5 times the radius of the spherical shapes.

* * * * *